(12) United States Patent
Van Blokland

(10) Patent No.: US 11,432,555 B2
(45) Date of Patent: Sep. 6, 2022

(54) DEVICE AND METHOD FOR PORTIONING A DOUGH MASS

(71) Applicant: Radie B.V., BC Culemborg (NL)

(72) Inventor: Johannes Josephus Antonius Van Blokland, BG Laren (NL)

(73) Assignee: RADIE B.V.

( * ) Notice: Subject to any disclaimer, the term of this patent is extended or adjusted under 35 U.S.C. 154(b) by 1 day.

(21) Appl. No.: 16/527,800

(22) Filed: Jul. 31, 2019

(65) Prior Publication Data
US 2020/0054025 A1 Feb. 20, 2020

(30) Foreign Application Priority Data
Aug. 2, 2018 (EP) ...................................... 8187057

(51) Int. Cl.
*A21C 5/00* (2006.01)
*A21C 9/04* (2006.01)
(Continued)

(52) U.S. Cl.
CPC ................ *A21C 5/003* (2013.01); *A21C 3/04* (2013.01); *A21C 3/10* (2013.01); *A21C 9/04* (2013.01); *A21C 9/08* (2013.01)

(58) Field of Classification Search
CPC .. A21C 5/003; A21C 3/04; A21C 3/10; A21C 9/04; A21C 9/08; B05C 5/0291; B05C 9/04
(Continued)

(56) References Cited

U.S. PATENT DOCUMENTS 2,588,125 A * 3/1952 Knowland .......... B05B 13/0473
427/424
3,053,223 A * 9/1962 Hensen ............... B05B 13/0278
118/610
(Continued)

FOREIGN PATENT DOCUMENTS

CH 629085 A5 4/1982
EP 0 466 519 A1 1/1992
(Continued)

OTHER PUBLICATIONS

Extended European Search Report for European Patent Application No. 18187057.7 dated Oct. 19, 2018.

*Primary Examiner* — Laura Edwards
(74) *Attorney, Agent, or Firm* — Katten Muchin Rosenman LLP

(57) ABSTRACT

The invention relates to a device for portioning a dough mass, comprising a receiving chamber for holding said dough mass comprising a discharge opening, a pair of opposing rotary cutters provided at the discharge opening and arranged for rotation in mutually opposite directions, wherein each cutter comprises at least one blade rotatable around a rotary axis, which blade cooperates with the blade of the other cutter for cutting the dough mass into separate portions, and a release agent delivery system for applying a release agent onto the blades of the rotary cutters, wherein the release agent delivery system is configured for applying the release agent on opposing sides of each of the blades. The invention further relates to a release agent delivery system for use in such a device and a method for portioning a dough mass using such a device.

15 Claims, 3 Drawing Sheets

(51) Int. Cl.
*A21C 9/08* (2006.01)
*A21C 3/04* (2006.01)
*A21C 3/10* (2006.01)

(58) Field of Classification Search
USPC .............................. 118/15, 24, 313, 315, 316
See application file for complete search history.

(56) References Cited

U.S. PATENT DOCUMENTS

| | | | |
|---|---|---|---|
| 3,773,448 A | | 11/1973 | Poot |
| 5,115,992 A | * | 5/1992 | Nugent ................. B02C 18/142 |
| | | | 241/236 |
| 5,824,349 A | | 10/1998 | Muller |
| 6,344,227 B1 | | 2/2002 | Schmidt |

FOREIGN PATENT DOCUMENTS

| | | |
|---|---|---|
| EP | 3 311 670 A1 | 4/2018 |
| GB | 1 276 559 A | 6/1972 |
| WO | 95/00024 A1 | 1/1995 |

* cited by examiner

DEVICE AND METHOD FOR PORTIONING A DOUGH MASS

RELATED APPLICATIONS

This application claims priority of European Patent Application No. 18187057, entitled "DEVICE AND METHOD FOR PORTIONING A DOUGH MASS," filed on Aug. 2, 2018 in the European Patent Office, and herein incorporated by reference in its entirety.

TECHNICAL FIELD

The invention relates to a device for portioning a dough mass. The invention further relates to a release agent delivery system for use in such a device and a method for portioning a dough mass using such a device.

BACKGROUND

Devices for portioning a dough mass, also commonly referred to as "chunkers", are well-known within the dough processing industry. These devices are often used at an early stage of a dough processing line, where a large dough mass typically originating from a dough mixer is via funnel led through a cutting unit for subdividing dough into smaller pieces. These smaller pieces of dough may then be transported by a conveyor to a next processing station where they are processed further.

In use, the presently known dough portioning devices however face some problems related to the fact that the dough mass to be portioned is soft and soggy, and therefore very adhesive. Because of this composition of the dough, the dough tends to adhere to both the funnel walls and the blades of the cutting unit, leaving behind residual dough that pollutes the funnel wall and blade surfaces. In addition to the resulting pollution that requires more frequent cleaning intervals and thus more downtime, the adhesiveness of the dough impedes a smooth passage of dough through the chunker. Namely, due to the friction between the funnel walls and the dough mass, the dough frequently gets stuck inside the funnel as it cannot be carried downwards under the influence of gravitational force. In addition, dough frequently remains adhered to the blades of the cutting unit, preventing a clean separation of the dough piece from the blades after being sectioned from the dough mass. This could lead to irregularities in the supply of dough pieces to an underlying conveyor and may result in variations in weight of the separated dough pieces.

Existing solutions to the above-mentioned problems related to the adhesive nature of the dough involve the use of conveyors inside the funnel that actively guide the dough mass downwards toward the cutting unit. These conveyors are however also prone to pollution and are moreover hard to clean. In addition, due to friction between the dough mass and the conveyor surface, the dough mass is subjected to sheer stresses, negatively influencing the dough characteristics. As another way of dealing with the adhesive nature of the dough, oil may be deposited along the funnel walls, which oil may then drip down onto the cutting unit. Due to the oil, the friction between the dough mass and the device surfaces is effectively decreased. It is however found that these solutions require the use of considerable amounts of oil which then unwantedly influence the consistency of the dough. Moreover, the large amounts of oil constitute an additional source of pollution for the chunker and possibly any devices in its close proximity and/or positioned downstream from the chunker.

SUMMARY

It is therefore an object of the present invention to provide for a solution of at least some of the above-mentioned problems related to the adherence of dough to the device surfaces and/or offer an alternative to existing solutions, therewith improving the dough mass portioning process.

The invention provides for this purpose a device for portioning a dough mass. The device according to the present invention comprises a receiving chamber for holding said dough mass comprising a discharge opening, a pair of opposing rotary cutters provided at the discharge opening and arranged for rotation in mutually opposite directions, wherein each cutter comprises at least one blade rotatable around a rotary axis, which blade cooperates with the blade of the other cutter for cutting the dough mass into separate portions, and a release agent delivery system or sprayer system for applying a release agent onto the blades of the rotary cutters, wherein the release agent delivery system is configured for applying the release agent on opposing sides of each of the blades.

BRIEF DESCRIPTION OF THE DRAWINGS

The present invention will now be elucidated further on the basis of the following non-limitative Figures, in which.

DETAILED DESCRIPTION

Figure 1:
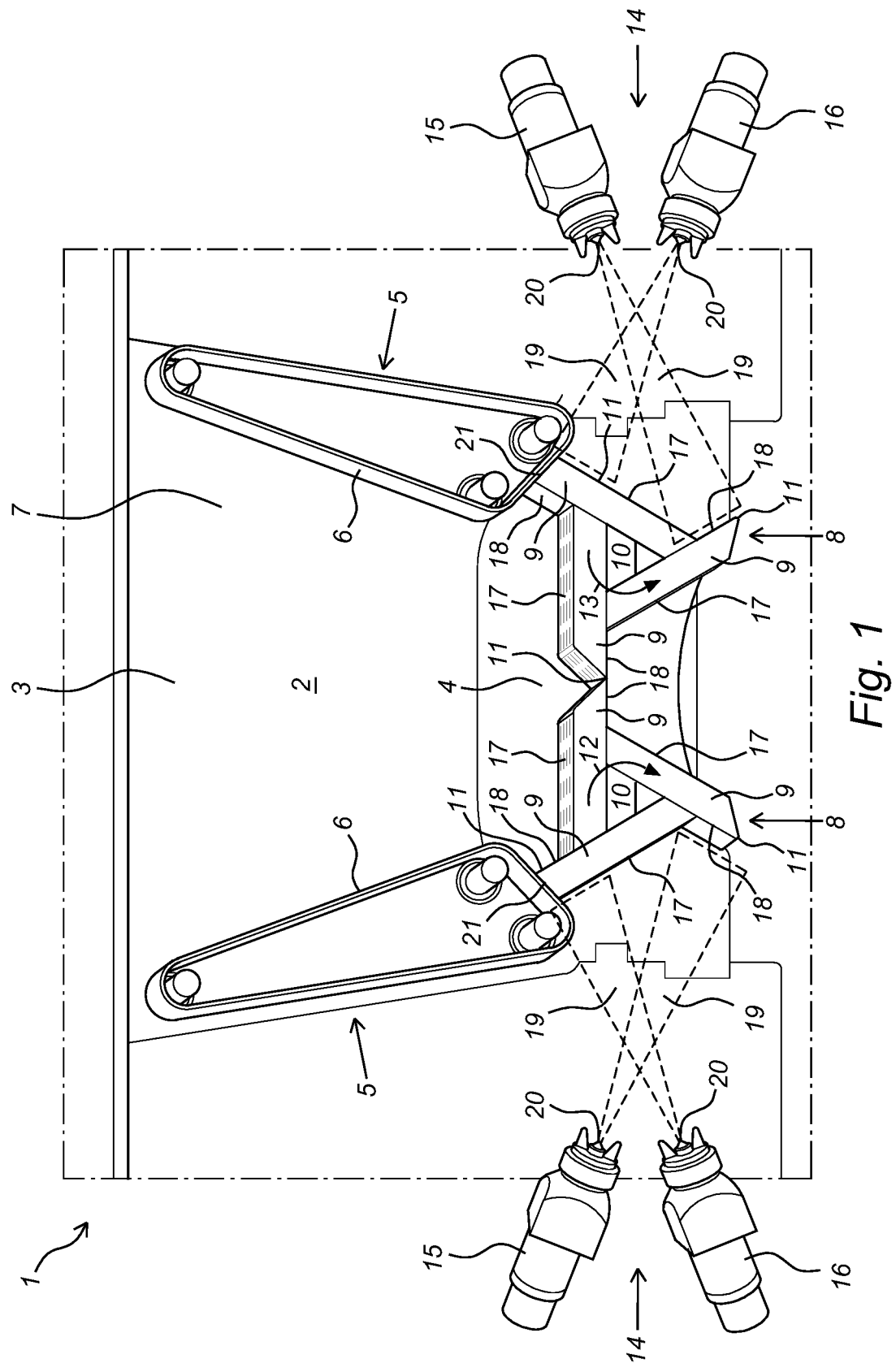
FIG. 1 shows a cross-sectional view on a device for portioning a dough mass according to the invention.

The Figures represent specific exemplary embodiments of the invention and should not be considered limiting the invention in any way or form. Throughout the description and the Figures, corresponding reference numerals are used for corresponding elements.

The receiving chamber may commonly be formed by a funnel, a hopper or a bin and often comprises an inlet opening opposite to the discharge opening through which dough can be supplied to the receiving chamber. The receiving chamber may moreover narrow in a direction from the inlet opening to the discharge opening to let the dough converge towards the discharge opening. The rotary cutters may extend parallel to their rotary axis along substantially entire length of the discharge opening, thereby forcing the dough to leave the receiving chamber via the rotary cutters only. The rotary cutters may commonly each comprise multiple blades. Moreover, the blades of each cutter typically rotate around the same axis of rotation, wherein the axes of rotation of both rotary cutters are positioned at a fixed mutual distance. This results in a movement of the blades of the opposing rotary cutters upon rotation of the cutters wherein the blades alternately move towards and away from each other. In a position of the cutters wherein the blades are closest towards each other, the blades just touch each other, thereby realizing a clean separation of any dough located between the blades at that moment.

The release agent delivery system is responsible for applying a release agent on opposing sides of each of the blades. This release agent may commonly comprise an edible oil, such as a vegetable oil. The application of the release agent to both sides of the blades is found to benefit a clean cut of the dough by the blades as well as a smooth and instant separation of the cut dough piece from the blades. Moreover, the buildup of pollution on the blades due to residual dough adhering to the blades is significantly reduced. With the application of the release agent to both sides of the blades, it is commonly ensured that at least the blade tips are supplied with a layer of release agent as the tip surfaces directly interact with the dough and are responsible for the cutting action. In a preferred embodiment of the device, the release agent delivery system is configured for applying the release agent on opposing sides of each blade every full rotation of rotary cutters. In this way the release agent is applied to both sides of every blade on a regular interval, ensuring that a layer of release agent is always present on both sides of the blades.

The release agent delivery system may comprise at least one pair of spray nozzles for directing a jet of release agent towards the rotary cutters, wherein each spray nozzle thereof is configured for applying the release agent onto the at least one blade of a different one of the rotary cutters. The use of spray nozzles as the main release agent delivery system allows for a targeted application of release agent onto the blades. This minimizes the pollution of surfaces and objects not intended to be provided with a layer of release agent. Moreover, the spray nozzles may be positioned at some distance from the rotary cutters, thereby not interfering with the rotation of said cutters. The pair of spray nozzles further allows each of the nozzles of said pair be directed to one of the rotary cutters only, further improving on the precision with which the release agent is applied to the blades. It is hereby preferred that the spray nozzles are positioned in close proximity to the cutters such that the dispersion of release agent onto surfaces not intended to be provided with release agent is minimized.

In a possible embodiment of the device according to the invention, the release agent delivery system may comprise at least two pairs of spray nozzles, wherein the spray nozzles of different pairs are configured for applying the release agent on a different one of the opposing sides of the blades. By allowing the spray nozzles to each target only one side of the at least one blade of a single rotary cutter, the precision with which the release agent is applied to the blades can be improved even further. By focusing a jet of release agent on one side of the at least one blade of a single rotary cutter, it can moreover be ensured that the blades of the rotary cutters are provided with an even, consistent and sufficient amount of release agent. As an alternative solution however, the spray nozzles may be moveable between a first spraying position and a second spraying position, wherein in the first spraying position the spray nozzles are configured for applying the release agent on one of the opposing sides of the blades and in the second spraying position the spray nozzles are configured for applying the release agent on the other one of the opposing sides of the blades. By allowing the spray nozzles to move, for example by means of a tilting movement, only a single spray nozzle would be necessary to cover both sides of the same blade.

The spray nozzles of different pairs may configured for consecutively applying the release agent onto the opposing sides of the at least one blade of one of the rotary cutters. With said consecutive application of the release agent onto the opposing sides of the blade, the spray nozzles between pairs intermittently direct a jet of release agent towards the blade, wherein said spray nozzles alternatingly apply the release agent onto the opposing side of the blade. A benefit of this intermittent spraying of release agent is that the spray nozzles may be positioned such that the trajectory of the jets of release agent exiting the different spray nozzles may cross without the jets of release agent actually interfering with each other. Such position of the spray nozzles may be necessary to cover the entire blade with release agent and/or let the jet of release agent hit the blade under a preferred angle while allowing the spray nozzles to be positioned within a limited space allocable for placement of the spray nozzles.

In order to ensure that the blades are in their entirety provided with a layer of release agent, the spray nozzles may be configured for applying the release agent along the entire width of blades, wherein the width of the blades is defined as the direction parallel to their rotary axis. As a way of enabling the release agent delivery system to cover the entire width of the blades, the release agent delivery system may comprise multiple pairs of spray nozzles, wherein said pairs are positioned in mutually spaced-apart locations along the width of the blades. The multiple pairs of spray nozzles are hereby able to cover the blades of both rotary cutters in their entire width, wherein the different spray nozzles of each pair are hereby assigned to apply the release agent onto the at least one blade of a different one of the rotary cutters. All blades of the rotary cutters can thus be covered with this spray nozzle setup, wherein the spray nozzles take a fixed position along the rotary cutters.

Alternatively, the spray nozzles may be moveable along the width of the blades. In this case, the entire width of blades of the rotary cutters may be covered with only a single pair of spray nozzles. To make a controlled movement of the spray nozzles along the blades possible, the spray nozzles may be moveably connected to a guide that extends parallel to the width of the blades. This guide may be formed by a magnetically coupled rodless pneumatic cylinder, which comprises a carrier onto which one or more spray nozzles may be fitted. A magnetically coupled rodless pneumatic cylinder typically has reduced dimensions compared to a traditional pneumatic cylinder. Moreover, as a magnetically coupled rodless pneumatic cylinder lacks a piston and no mechanical movement takes place, this type of guide is very durable. It may also be possible that the release agent delivery system comprises multiple pairs of spray nozzles positioned in mutually spaced-apart locations along the width of the blades, while some or all of these spray nozzles are at the same time moveable along the width of the blades. Multiple, moveable spray nozzles may hereby work together to cover the entire width of a blade.

In a specific embodiment of the device according to the invention, the spray nozzles are configured for generating a jet consisting of droplets of release agent having a droplet size with a minimum volume median diameter of 250 microns. Although a fine atomization of the release agent results in a good distribution of release agent over the blade surface, the fine release agent droplets due to their low mass also have the tendency to disperse easily, thereby polluting surfaces not intended to be provided with a layer of release agent. Through experimentation it is found that droplets with a minimum volume median diameter of 250 microns do not disperse or only disperse to a limited extend, resulting in a jet that precisely targets the blade and the blade only, thereby preventing pollution of surrounding surfaces.

The spray nozzles of the release agent delivery system may each comprise a first fluid inlet connected to a feed of release agent and debouching into a first outlet orifice, and a second fluid inlet connected to a feed of pressurized air and debouching into a second outlet orifice, wherein the second outlet orifice at least partially surrounds the first outlet orifice and wherein the first and second outlet orifices cooperate to generate a jet of atomized release agent. The atomization of the release agent hereby takes place due to the interaction of the pressurized air leaving the second outlet orifice as a high velocity air stream with the release agent which is drawn out of the first outlet orifice due to an underpressure created by the high velocity air stream. The mutual orientation of the first and second outlet orifices is preferably chosen such that mixing and atomization of liquid takes place outside the nozzle. By regulating the air flow rate, the drop size of the atomized release agent can be controlled, wherein a reduction in air stream velocity leads to an increase in droplet size. It is found that application of above type of spray nozzle leads to focused jet of release agent that can be directed precisely onto the rotary cutter blades. Moreover, the above type of spray nozzle may be configured to produce droplets with a volume median diameter of 250 microns and up. The feed of release agent may also be pressurized to aid in the supply of release agent to the first outlet orifice. This is especially the case when the stream of air exiting the second outlet orifice does not have a high enough velocity to provide for the underpressure necessary for a sufficient amount of release agent to be drawn out of the first outlet orifice. The first outlet orifice may further be fitted with a closing element, such as a needle, with which the outflow of release agent can be controlled further.

The receiving chamber may comprise at least one belt conveyor, comprising a conveyor belt forming a part of a side wall of the receiving chamber. The conveyor belt hereby commonly extends in a direction of conveyance between the inlet opening and the discharge opening of the receiving chamber. Due to the application of at least one belt conveyor, the device according to the invention is able to actively carry dough through the receiving chamber instead of having to rely on gravity alone. It herewith becomes possible to guide even the stickiest of dough types through the receiving chamber towards or away from the discharge opening and the rotary cutters, dependent on the chosen direction of conveyance of the at least one conveyor belt. The receiving chamber may comprise two belt conveyors which may be positioned opposite from each other to form opposing parts of the inner side wall of the receiving chamber. It is found that the use of two opposing belt conveyors leads to a reliable guidance of the dough mass through the receiving chamber towards the discharge opening and the rotary cutters placed behind it.

In a common instance the at least one belt conveyor may at the discharge opening be positioned adjacent to the pair of rotary cutters, wherein at least one of the rotary cutters with its at least one blade scrapes one of the at least one conveyor belt. In case the receiving chamber comprises two belt conveyors, each cutter is typically configured to scrape with its blades a different one of the conveyor belts of said belt conveyors. The scraping of the one or more conveyor belts will remove residual dough adhering to the conveyor belts, thereby effectively reducing pollution of the conveyor belts.

As another way of reducing pollution of the at least one conveyor belt as well as aiding the transport of dough through the receiving chamber, the release agent delivery system may be configured for applying the release agent onto the at least one conveyor belt. Namely, by providing the at least one conveyor belt with a layer of release agent the adhering of the dough mass to the at least one conveyor belt is reduced or even entirely prevented. In a possible embodiment, the release agent delivery system hereto comprises one or more spray nozzles that are configured to direct a jet of release agent onto a conveyor belt and a rotary cutter simultaneously. Typically, the spray nozzle hereby directs its jet of release agent towards a bottom end of the conveyor belt adjacent to the rotary cutter.

It is especially advantageous if the device according to the invention combined with a device for guiding and supplying dough to a dough processing or transporting means as described in a parallel application with the title "device for guiding and supplying dough to a dough processing or transporting means" filed on the same day as the present application by the same applicant, which is hereby incorporated by reference. Namely, both applications relate to an invention that provides a solution for handling an adhesive dough mass within the context of a dough portioning operation using a chunker. Specifically, the design of the receiving chamber comprising the at least one conveyor belt as well as at least two sealing strips that create a seal between the conveyor belt and an adjoining stationary wall of the receiving chamber may form a valuable addition to a device for portioning a dough mass according to the present invention. In particular the sealing strips as described in said parallel application make sure that no dough is able to end up between a side end of the conveyor belt and an adjoining stationary wall where it could further penetrate between the receiving chamber wall parts and conveyor internals. The sealing strips thus ensure that the dough remains contained inside the receiving chamber, considerably reducing consecutive cleaning operations which can be limited to the receiving chamber internal wall.

The invention also relates to a release agent delivery system for use in a device according to the invention, the benefits of which system are already explained in relation to the device for portioning a dough mass.

The invention further relates to a method for portioning a dough mass using a device for portioning a dough mass according to the invention, comprising the steps of: A) supplying a dough mass to the receiving chamber, B) guiding the dough mass to the pair of opposing rotary cutters, C) rotating the blades of the rotary cutters, thereby cutting the dough mass into separate portions, and D) applying a release agent to the blades, wherein during step D) the release agent is applied on opposing sides of each of the blades. As already mentioned before, the application of the release agent to both sides of the blades is found to benefit a clean cut of the dough by the blades as well as a smooth and instant separation of the cut dough piece from the blades. Moreover, the buildup of pollution on the blades due to residual dough adhering to the blades is significantly reduced.

The above-described method steps are commonly performed concurrently as part of a continuous process. In case the receiving chamber comprises at least one belt conveyor, it is moreover advantageous if together with the release agent being applied to opposing sides of each of the blades, the release agent is applied to the conveyor belt of the at least one belt conveyor, thereby counteracting sticking of the dough mass to the conveyor belt.

FIG. 1 shows a cross-sectional view on a device 1 for portioning a dough mass according to the invention. The device 1 comprises a receiving chamber 2 that in this case is funnel-shaped and narrows in a downward direction. It is however likewise possible that the receiving chamber 2 does not converge in a downward direction, but for example has side walls that run straight down. An inlet opening 3 is present at the top of the receiving chamber 2, through which inlet opening 3 dough is supplied to the receiving chamber 2. At the bottom of the receiving chamber 2 opposite to the inlet opening 3 a discharge opening 4 is provided towards which the dough is guided. The receiving chamber 2 is demarcated by two opposing belt conveyors 5, each comprising a conveyor belt 6 that forms part of a side wall of the receiving chamber 2. The belt conveyors 5 are placed between two stationary walls 7 (one of which is shown in FIG. 1) that form another part of the side wall of the receiving chamber 2 thereby further demarcating the receiving chamber 2. A pair of opposing rotary cutters 8 is positioned at the discharge opening 4, which cutters 8 each comprise three blades 9 that are rotatable around a rotary axis 10 and comprise a cutting edge 11. The blades 9 of the different rotary cutters 8 hereby rotate in mutually opposite directions 12, 13. The rotary cutters 8 are moreover positioned in the vicinity of the conveyor belts 6 such that the cutters 8 with the cutting edge 11 of their blades 9 each scrape one of the conveyor belts 6. The device 1 further comprises a release agent delivery system 14 positioned in the vicinity of the rotary cutters 8. The release agent delivery system 14 comprises two pairs of spray nozzles 15, 16, which spray nozzles 15, 16 are configured for applying a release agent on opposing sides 17, 18 of each of the blades 9 of the rotary cutters 8. Each of the spray nozzles 15, 16 hereto produces a jet 19 of release agent that exits an outlet orifice 20 thereof and is directed towards the blades 9. The first pair of spray nozzles 15 hereby targets a rear side 17 of the blades 9, wherein the second pair of spray nozzles 16 targets a front side 18 of the blades 9. The jets 19 of release agent exiting the first pair of spray nozzles 15 moreover target a bottom end 21 of the conveyor belts 6 adjacent to the rotary cutters 8, wherein the release agent is concurrently applied onto the conveyor belts 6.

Figure 2:
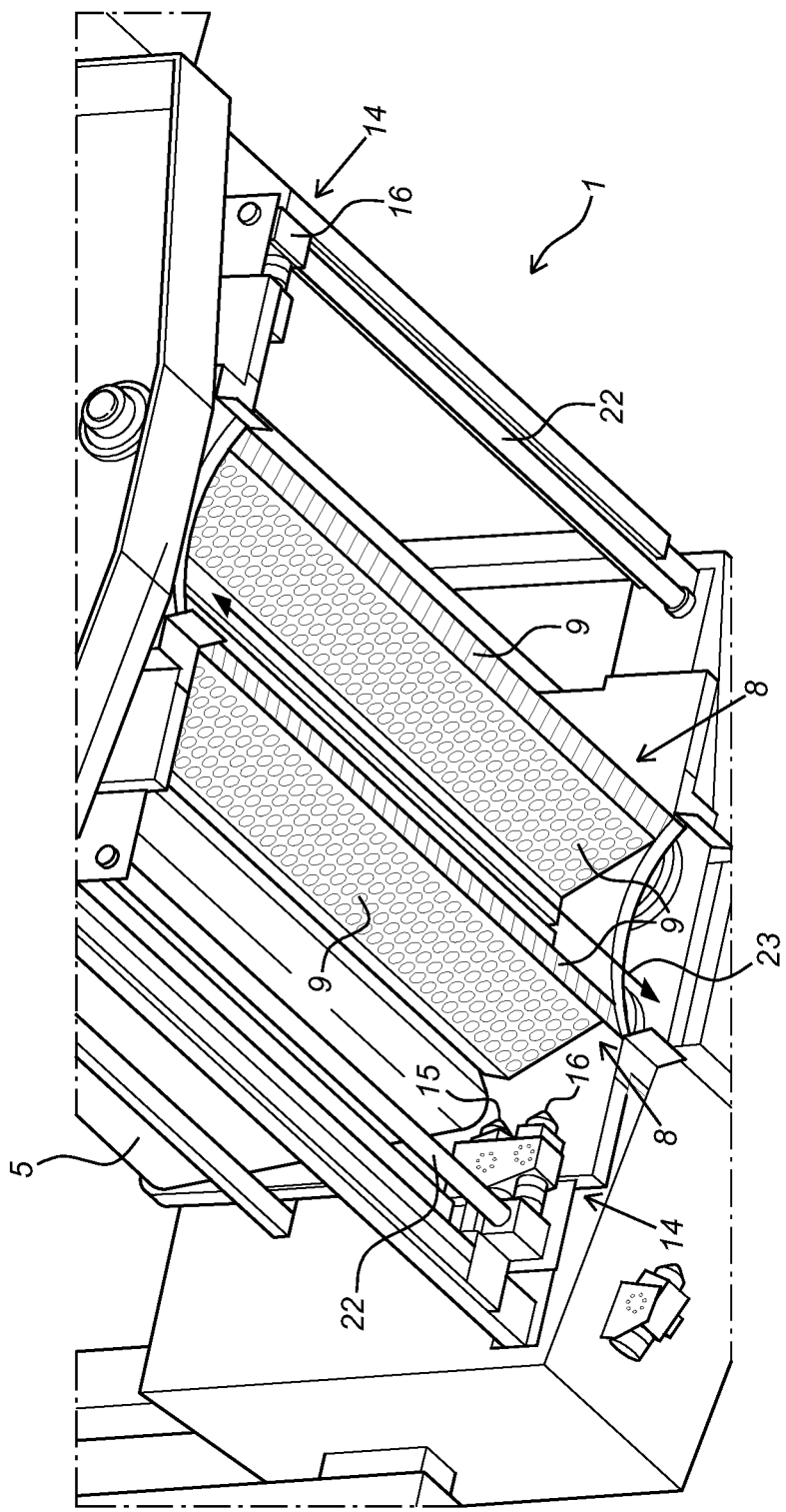
FIG. 2 shows a perspective view on the bottom of the device of FIG. 1.

FIG. 2 shows a perspective view on the bottom of the device 1 for portioning a dough mass as shown in FIG. 1. In this Figure, one of the opposing belt conveyors 5 is again visible, as well as both rotary cutters 8. The release agent delivery system 14 comprises in this embodiment of the device 1 two pairs of spray nozzles 15, 16, wherein the spray nozzles of different pairs 15, 16 are configured for spraying the release agent on a different one of the opposing sides 17, 18 of the blades 9. The spray nozzles 15, 16 are per two spray nozzles (one of each pair) mounted onto a guide 22 along which they can move along the width 23 of the blades 9. This enables the spray nozzles 15, 16 to cover the entire width 23 of the blades 9 with a layer of release agent.

Figure 3:
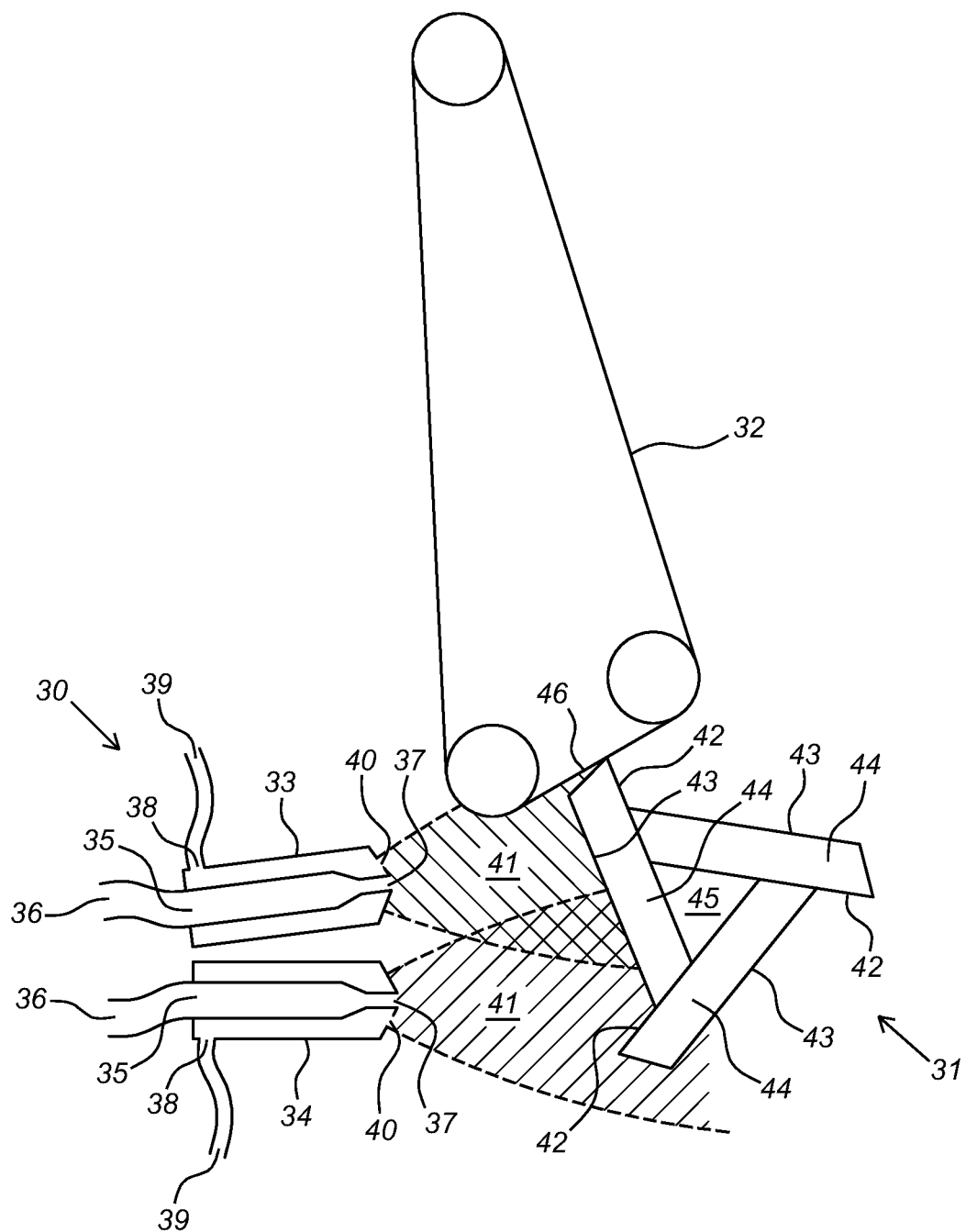
FIG. 3 shows a schematic representation of a release agent delivery system according to the invention and its position relative to a rotary cutter and belt conveyor as comprised in a device for portioning a dough mass according to the invention.

FIG. 3 shows a schematic representation of a release agent delivery system 30 according to the invention and its position relative to a rotary cutter 31 and a conveyor belt 32 as comprised in a device for portioning a dough mass according to the invention. In the Figure, a cross-section of two spray nozzles 33, 34 is shown, which two spray nozzles 33, 34 typically form only a part of the release agent delivery system 30. The spray nozzles 33, 34 each comprise a first fluid inlet 35 connected to a feed 36 of release agent and debouching into a first outlet orifice 37, and a second fluid inlet 38 connected to a feed 39 of pressurized air and debouching into a second outlet orifice 40. The first and second outlet orifices 37, 40 cooperate to generate a jet 41 of atomized release agent, wherein a stream of air exiting the second outlet orifice 40 takes along the release agent exiting the first outlet orifice 37, which first outlet orifice 37 is surrounded by the second outlet orifice 40. In the shown embodiment of the spray nozzles 33, 34, the first and second outlet orifices 37, 40 debouch in an area in front of and external to the nozzle 33, 34, wherein the mixing of the release agent with the air and therewith the atomization of the release agent takes place outside the nozzle 33, 34. With the atomization of the release agent a jet 41 of release agent is produced exiting each of the spray nozzles 33, 34. These two jets 41 together cover both the front side 42 and rear side 43 of the blades 44 of the rotary cutter 31 as the blades 44 rotate around their rotary axis 45. One of the spray nozzles 33 is further configured to cover part of the conveyor belt 32 at a bottom end 46 of the conveyor belt 32 adjacent to the rotary cutter 31. The surface of the conveyor belt 32 is herewith constantly provided with layer of release agent, which is reapplied every revolution of the conveyor belt 32.

The invention claimed is:

1. A device for portioning a dough mass, comprising:
a receiving chamber for holding said dough mass comprising a discharge opening,
a pair of opposing rotary cutters provided at the discharge opening and arranged for rotation in mutually opposite directions, wherein each cutter comprises at least one blade rotatable around a rotary axis, which blade cooperates with the blade of the other cutter for cutting the dough mass into separate portions, and
a sprayer system configured for applying a release agent onto the blades of the rotary cutters,
wherein the sprayer system is configured for applying the release agent on both opposing sides of each of the blades,
wherein the receiving chamber comprises at least one belt conveyor comprising a conveyor belt forming a part of a side wall of the receiving chamber, and
wherein the sprayer system is configured for applying the release agent onto the conveyor belt.

2. The device according to claim 1, wherein the sprayer system is configured for applying the release agent on opposing sides of each blade every full rotation of rotary cutters.

3. The device according to claim 1, wherein the sprayer system comprises at least one pair of spray nozzles for directing a jet of release agent towards the rotary cutters, wherein each spray nozzle thereof is configured for applying the release agent onto the at least one blade of a different one of the rotary cutters.

4. The device according to claim 3, wherein the sprayer system comprises at least two pairs of spray nozzles, wherein the spray nozzles of different pairs are configured for applying the release agent on a different one of the opposing sides of the blades.

5. The device according to claim 4, wherein the spray nozzles of different pairs are configured for consecutively applying the release agent onto the opposing sides of the at least one blade of one of the rotary cutters.

6. The device according to claim 4, wherein the spray nozzles are configured for applying the release agent along the entire width of blades, wherein the width of the blades is defined as the direction parallel to their rotary axis.

7. The device according to claim 6, wherein the sprayer system comprises multiple pairs of spray nozzles, wherein said pairs are positioned in mutually spaced-apart locations along the width of the blades.

8. The device according to claim 6, wherein the spray nozzles are moveable along the width of the blades.

9. The device according to claim 3, wherein the spray nozzles are configured for generating a jet consisting of droplets of release agent having a droplet size with a minimum volume median diameter of 250 microns.

10. The device according to claim 3, wherein the spray nozzles each comprise:
   a first fluid inlet connected to a feed of release agent and debouching into a first outlet orifice, and
   a second fluid inlet connected to a feed of pressurized air and debouching into a second outlet orifice,
   wherein the second outlet orifice at least partially surrounds the first outlet orifice and wherein the first and second outlet orifices cooperate to generate a jet of atomized release agent.

11. The device according to claim 1, wherein the at least one belt conveyor is at the discharge opening positioned adjacent to the pair of rotary cutters, wherein at least one of the rotary cutters with its at least one blade scrapes one of the at least one conveyor belt.

12. The device according to claim 1 wherein the sprayer system is configured to apply a layer of the release agent onto the blades.

13. The device according to claim 12 wherein the sprayer system is configured to apply a layer of the release agent on to at least tips of the blades.

14. The device according to claim 1 wherein the release agent is a sub stance.

15. The device according to claim 14 wherein the substance is an oil.

* * * * *

UNITED STATES PATENT AND TRADEMARK OFFICE
CERTIFICATE OF CORRECTION

| | |
|---|---|
| PATENT NO. | : 11,432,555 B2 |
| APPLICATION NO. | : 16/527800 |
| DATED | : September 6, 2022 |
| INVENTOR(S) | : Van Blokland |

It is certified that error appears in the above-identified patent and that said Letters Patent is hereby corrected as shown below:

In the Claims

Column 9, Line 25, delete "sub stance" and insert --substance-- therefor.

Signed and Sealed this
Tenth Day of October, 2023

*Katherine Kelly Vidal*

Katherine Kelly Vidal
*Director of the United States Patent and Trademark Office*